United States Patent
Uchida

(10) Patent No.: US 8,269,791 B2
(45) Date of Patent: Sep. 18, 2012

(54) INFORMATION PROCESSING APPARATUS AND METHOD FOR PROCESSING A VECTOR IMAGE COMPOSED OF A PLURALITY OF OBJECTS DESCRIBED BY STRUCTURED DOCUMENT DATA

(75) Inventor: Hitoshi Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 11/423,222

(22) Filed: Jun. 9, 2006

(65) Prior Publication Data

US 2006/0280373 A1 Dec. 14, 2006

(30) Foreign Application Priority Data

Jun. 10, 2005 (JP) .................................. 2005-171657
Mar. 31, 2006 (JP) .................................. 2006-100389

(51) Int. Cl.
*G09G 5/00* (2006.01)
(52) U.S. Cl. ...................................... 345/620; 345/619
(58) Field of Classification Search .................. 345/620, 345/619; 382/305; 709/217
See application file for complete search history.

(56) References Cited

U.S. PATENT DOCUMENTS

| 6,449,639 | B1 * | 9/2002 | Blumberg | 709/217 |
|---|---|---|---|---|
| 2002/0023113 | A1 * | 2/2002 | Hsing et al. | 707/513 |
| 2003/0229441 | A1 * | 12/2003 | Pechatnikov et al. | 701/201 |
| 2004/0028294 | A1 * | 2/2004 | Fukuda | 382/305 |
| 2005/0147312 | A1 * | 7/2005 | Chen | 382/242 |

FOREIGN PATENT DOCUMENTS

| JP | 2000-242484 A | 9/2000 |
|---|---|---|
| JP | 2001-209369 A | 8/2001 |
| JP | 2001-312736 A | 11/2001 |
| JP | 2005-056039 A | 3/2005 |

OTHER PUBLICATIONS

Anderson, Geoffrey and Rafael Moreno-Sanchez, Building Web-Based Spatial Information Solutions around Open Specification and Open Source Software, Mar. 2003, Blackwell Publishing, Transactions in GIS, vol. 7, No. 4, pp. 447-466.*
Ahn, Young Joon and Hong Oh Kim, Approximation of circular arcs by Bezier curves, Feb. 1997, Elsevier Science, Journal of Computational and Applied Mathematics 81, pp. 145-163.*
Open Geospatial Consortium, Inc., OpenGIS Geography Markup Language (GML) Encoding Specification, 2002.*
W3C, Document Object Model (DOM) Level 1 Specification, Oct. 1, 1998, pp. 77-78. http://www.w3.org/TR/1998/REC-DOM-Level-1-19981001/DOM.pdf.*

* cited by examiner

*Primary Examiner* — Chante Harrison
(74) *Attorney, Agent, or Firm* — Canon USA Inc. IP Division

(57) ABSTRACT

An information processing apparatus for processing a structured document describing a vector image includes a determining unit configured to determine whether an object in a vector image obtained by analyzing a structured document is included in a specified area. The information processing apparatus also includes a creating unit configured to create a structured document describing an object included in the specified area by deleting a description of an object if the determining unit determines that the object is not included in the specified area.

17 Claims, 20 Drawing Sheets

```
<svg>
    <circle cx="300" cy="100" r="70"
        stroke="blue" stroke-width="10"/>    }710
    <image x="100" y="200" width="200" height="200"
        xlink:href="image.png"/>             }711
    <text x="370" y="300">ABCDEF</text>      ~712
    <g>
        <rect x="450" y="100" width="100" height="100"/> ~713
    </g>
</svg>
```

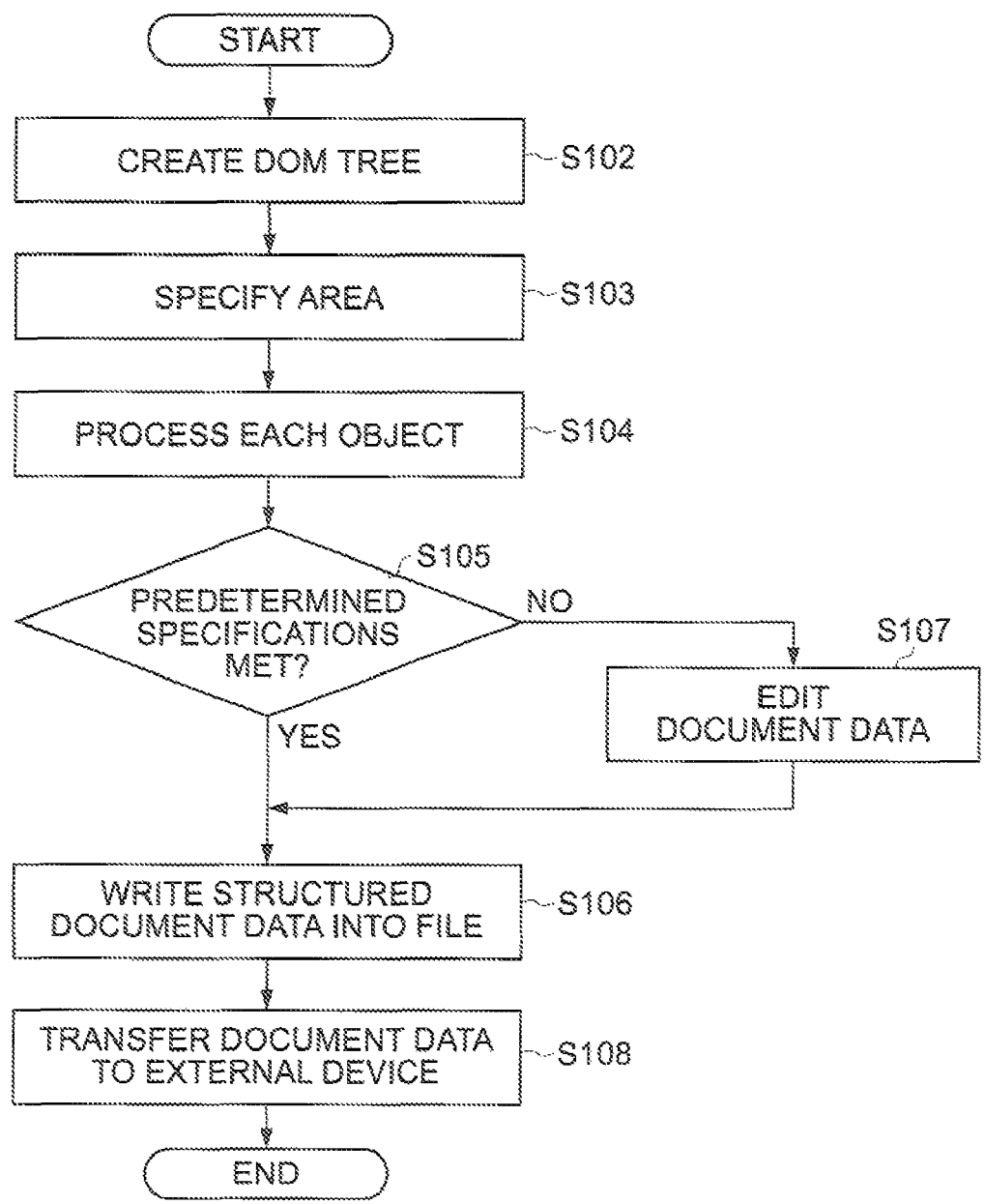

```
<svg>
    <polyline fill="none" stroke="black" stroke-width="15"
             points="100,100
                     200,300 300,100 400,300 500,100
                     600,300"/>
</svg>
```

ZOOM

IMAGE DATA

GRAPHICS DATA    TEXT DATA

FIG. 25
STRUCTURED DOCUMENT DATA BEFORE CONVERSION

```xml
<?xml version="1.0" encoding="UTF-8" standalone="no"?>
<svg xmlns="http://www.w3.org/2000/svg"
     xmlns:xlink="http://www.w3.org/1999/xlink"
     x="0" y="0"
     width="1500" height="1500">

<g>
  <text x="76.9384995" y="58.6819153" font-size="10">Japan</text>

<text x="270" y="300" font-size="10">Hokkaido</text>
  <path fill="none" stroke="black" stroke-width="2.0"
        d="M 238.6485 274.5447 C 250.5595 250.7218 ...(snip)..."/>

<text x="1320" y="720" font-size="10">Tokyo</text>
  <path fill="none" stroke="black" stroke-width="2.0"
        d="M 399.0951 697.1233 C 375.8264 697.1233 ...(snip)..."/>

<text x="1320" y="796" font-size="10">Kanagawa</text>
  <path fill="none" stroke="black" stroke-width="2.0"
        d="M 350.5243 723.1831 C 357.194 725.8937 ...(snip)..."/>

:
  (snip)
  :
</g>
</svg>
```

FIG. 26

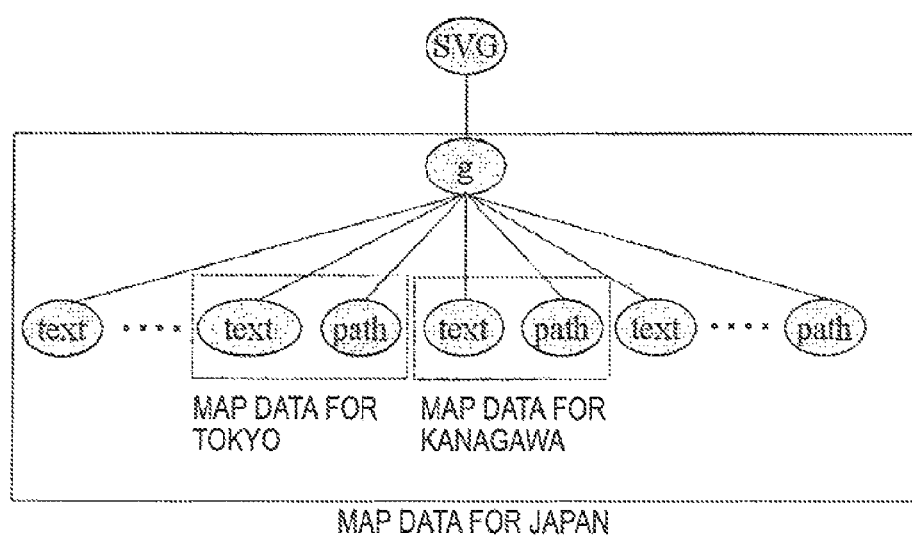

STRUCTURED DOCUMENT DATA OBTAINED BY CONVERSION
```
<?xml version="1.0" encoding="UTF-8" standalone="no"?>
<svg xmlns="http://www.w3.org/2000/svg"
     xmlns:xlink="http://www.w3.org/1999/xlink"
     x="0" y="0"
     width="1500" height="1500">

<g>
    <text x="453" y="720" font-size="10">Tokyo</text>
    <path fill="none" stroke="black" stroke-width="2.0"
          d="M 399.0951 697.1233 C 375.8264 697.1233 ...(snip)..."/>
  </g>
</svg>
```

MAP DATA FOR TOKYO

FIG. 29

STRUCTURED DOCUMENT DATA OBTAINED BY CONVERSION

```
<?xml version="1.0" encoding="UTF-8" standalone="no"?>
<svg xmlns="http://www.w3.org/2000/svg"
     xmlns:xlink="http://www.w3.org/1999/xlink"
     x="0" y="0"
     width="1500" height="1500">
                                                         ADDED DATA
    <g transform="translate(230,230),scale(5,5),translate(-455,-709)">

<text x="453" y="720" font-size="10">Tokyo</text>
        <path fill="none" stroke="black" stroke-width="2.0"
            d="M 399.0951 697.1233 C 375.8264 697.1233 ...(snip)..."/>
    </g>
</svg>
```

FIG. 30

STRUCTURED DOCUMENT DATA OBTAINED BY CONVERSION

```
<?xml version="1.0" encoding="UTF-8" standalone="no"?>
<svg xmlns="http://www.w3.org/2000/svg"
     xmlns:xlink="http://www.w3.org/1999/xlink"
     x="0" y="0"
     width="1500" height="1500"
     viewBox="340 594 460 460">      ADDED DATA <g>
        <text x="453" y="720" font-size="10">Tokyo</text>
        <path fill="none" stroke="black" stroke-width="2.0"
            d="M 399.0951 697.1233 C 375.8264 697.1233 ...(snip)..."/>
    </g>
</svg>
```

FIG. 31

STRUCTURED DOCUMENT DATA OBTAINED BY CONVERSION

```
<?xml version="1.0" encoding="UTF-8" standalone="no"?>
<svg xmlns="http://www.w3.org/2000/svg"
     xmlns:xlink="http://www.w3.org/1999/xlink"
     x="0" y="0"
     width="1500" height="1500">
    <g>
        <text x="113" y="126" font-size="20">Tokyo</text>
        <path fill="none" stroke="black" stroke-width="4.0"
              d="M 118.1902 206.2466 C 71.6528 206.2466 ...(snip)..."/>
    </g>
</svg>
```

UPDATED DATA

INFORMATION PROCESSING APPARATUS AND METHOD FOR PROCESSING A VECTOR IMAGE COMPOSED OF A PLURALITY OF OBJECTS DESCRIBED BY STRUCTURED DOCUMENT DATA

BACKGROUND OF THE INVENTION

1. Field of the Invention

The present invention relates to information processing apparatuses and methods for processing a vector image composed of a plurality of objects described by structured document data.

2. Description of the Related Art

Vector images have an advantage of being capable of representing high-quality objects. Examples of graphics drawing application software for creating and editing such vector images include Illustrator® from Adobe Systems Incorporated. Illustrator® allows for editing of images by moving objects in a specified area.

An exemplary extensible markup language (XML)-based language for describing vector images is scalable vector graphics (SVG) which is compliant with specifications developed by the World Wide Web Consortium (W3C) standards body. For example, an SVG file describing a vector image shown in FIG. 1 is transferred via a communication network to a device with low processing capabilities. In this case, even if only an area 1003 is a graphic area that the user wishes to send, all objects 1000 to 1002 in FIG. 1 must be turned into graphics. This not only places a heavy load on the receiving device, but also results in a long transfer time and the usage of a large amount of memory in the receiving device. In particular when, as shown in FIG. 2, FIG. 3, and FIG. 4, only a small portion of a graphics, text, or image object is included in a specified area 2000, 3000, or 4000, it is possible that a large amount of memory space is used up by unnecessary data.

SUMMARY OF THE INVENTION

The present invention has been made in view of the problems described above. An information processing apparatus and method are configured to extract, from a vector image containing a plurality of objects, only data of objects included in a specified area and to save the extracted data as vector data.

According to an aspect of the present invention, an information processing apparatus for processing a structured document describing a vector image includes: a drawing unit configured to draw a vector image obtained by analyzing a structured document; a detecting unit configured to detect a specified area in the vector image drawn by the drawing unit; a determining unit configured to determine whether objects in the vector image are included in the specified area; and a creating unit configured to create a structured document describing objects included in the specified area by deleting a description of objects determined by the determining unit not to be included in the specified area.

Further features of the present invention will become apparent from the following description of exemplary embodiments with reference to the attached drawings.

BRIEF DESCRIPTION OF THE DRAWINGS

FIG. 8 is a flowchart showing an exemplary procedure of extracting an image included in a specified area from a vector image according to the first exemplary embodiment.

FIGS. 12A, 12B, 13A, and 13B show exemplary processing performed on a graphics object according to the first exemplary embodiment.

FIG. 25 shows exemplary structured document data before conversion.

FIG. 26 shows an exemplary DOM tree corresponding to the drawing data in FIG. 22A.

FIG. 29 shows exemplary structured document data obtained by conversion.

FIG. 30 shows exemplary structured document data obtained by conversion.

FIG. 31 shows exemplary structured document data obtained by conversion.

DESCRIPTION OF THE EMBODIMENTS

Exemplary embodiments of the present invention will now be described in detail with reference to the attached drawings. The exemplary embodiments described below are not intended to limit the scope of the present invention, and not all combinations of features described in the exemplary embodiments are required for implementing the principles of the present invention.

First Exemplary Embodiment

A first exemplary embodiment of the present invention is described next.

Figure 1:
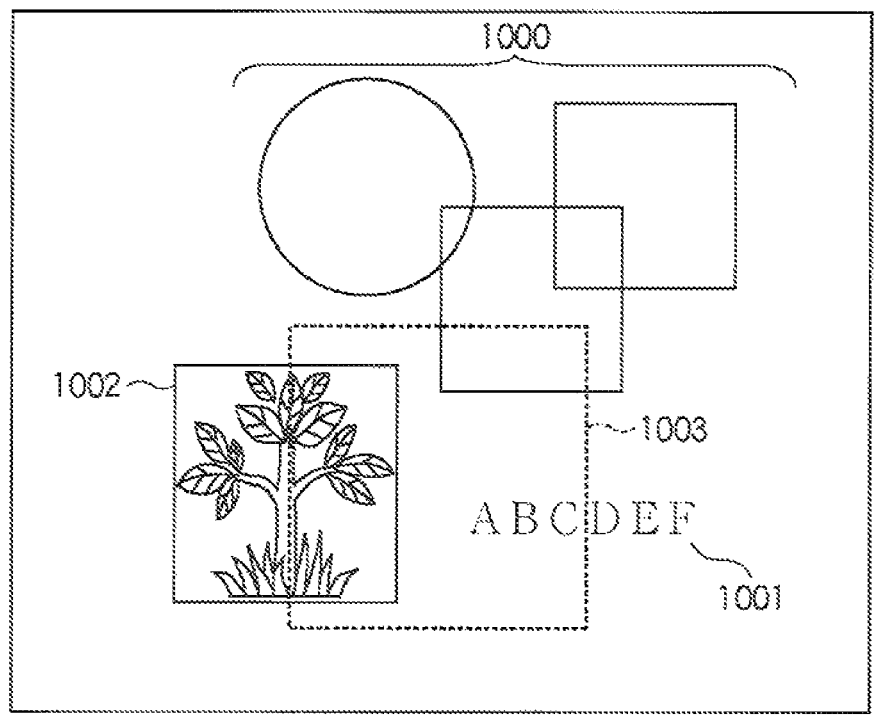
FIG. 1 shows an exemplary vector image containing graphics, text, and image data objects.
Figure 2:
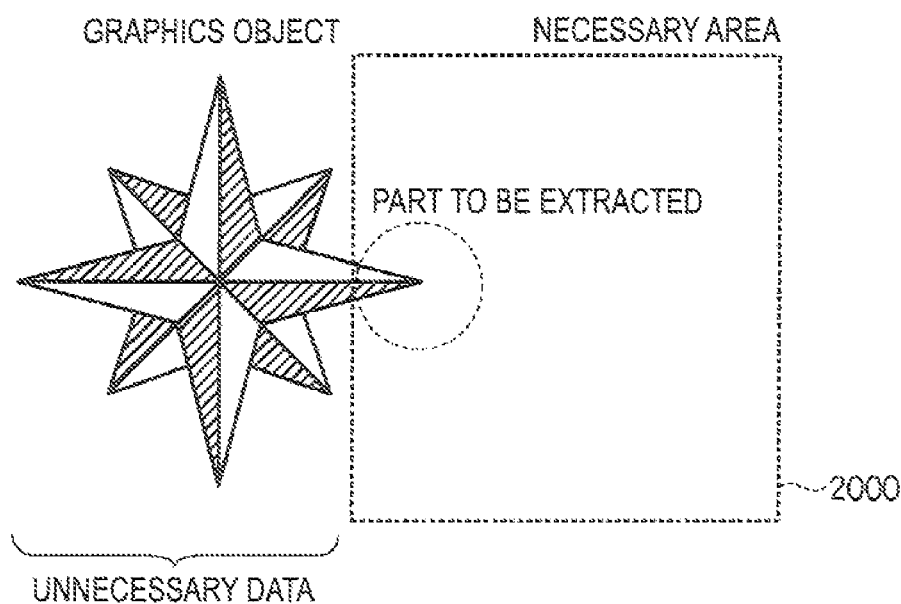
FIG. 2 shows an example of specifying an area and extracting a part of a graphics object.
Figure 3:
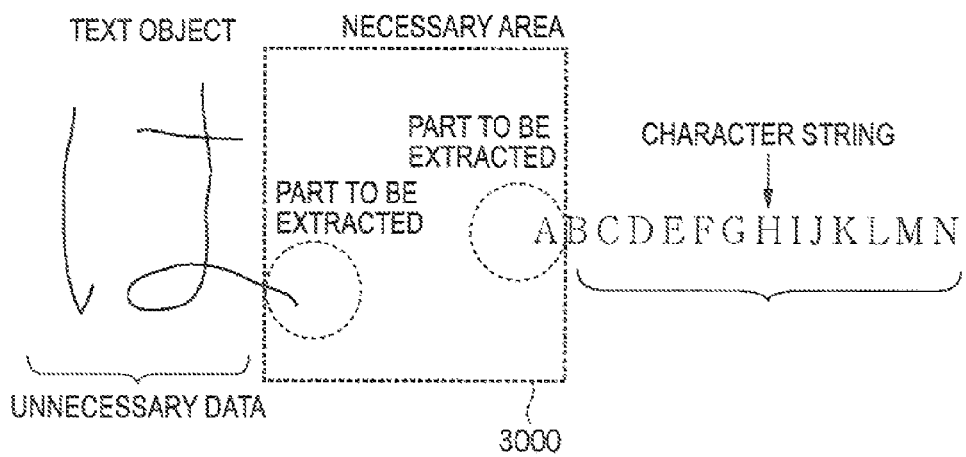
FIG. 3 shows an example of specifying an area and extracting parts of text objects.
Figure 4:
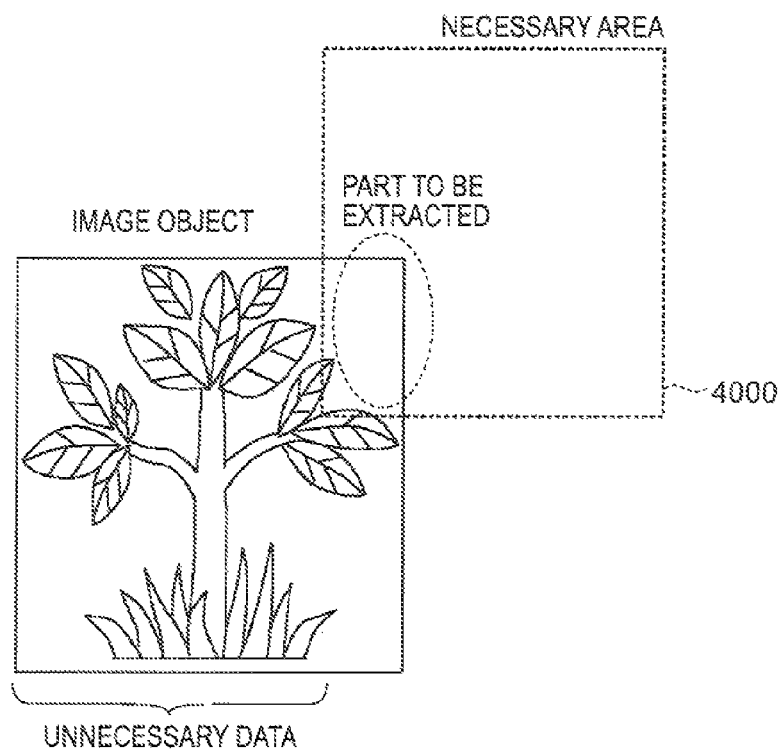
FIG. 4 shows an example of specifying an area and extracting a part of an image object.
Figure 5:
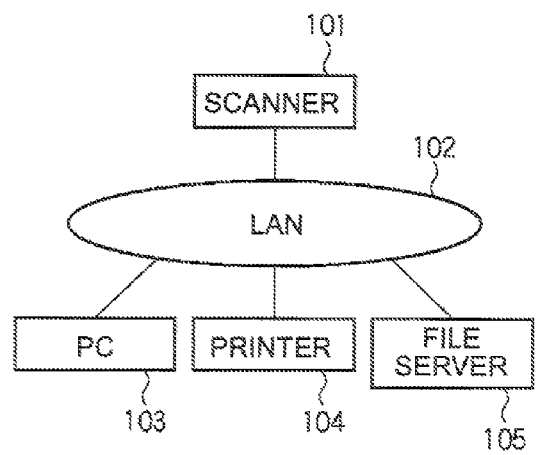
FIG. 5 is a block diagram showing an overview of a system according to at least one exemplary embodiment of the present invention.

FIG. 5 is a block diagram showing an overview of a system according to the present exemplary embodiment of the present invention.

Referring to FIG. 5, a scanner 101 is connected to a local area network (LAN) 102. A PC (information processing apparatus) 103 serving as a client, a network printer 104, and a file server 105 are also connected to the LAN 102.

Figure 6:
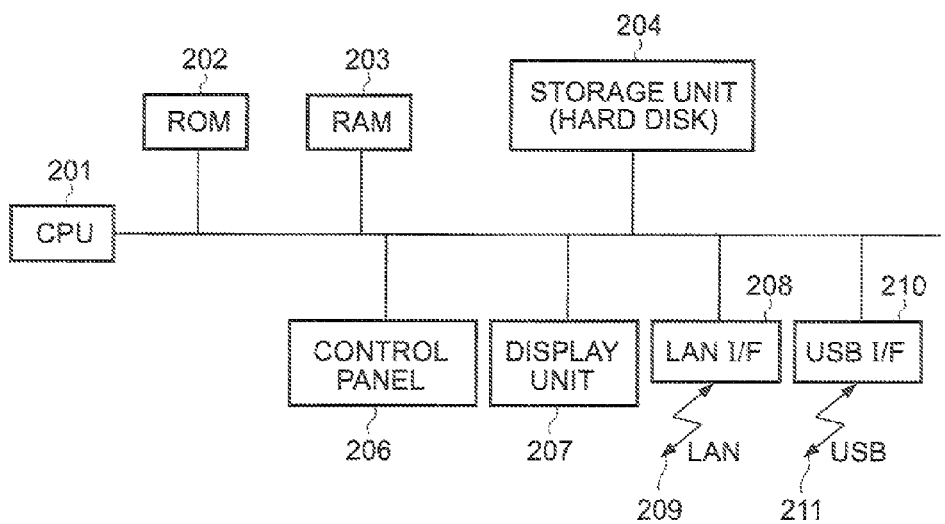
FIG. 6 is a block diagram showing a configuration of a personal computer (PC) 103 according to at least one exemplary embodiment.

FIG. 6 is a block diagram showing a configuration of the PC 103 according to the present exemplary embodiment.

Referring to FIG. 6, a central processing unit (CPU) 201 serves as a system controller and controls the PC 103. A control program for the CPU 201 and various types of fixed data are stored in a read only memory (ROM) 202. A random access memory (RAM) 203 is a static random access memory (SRAM) or a dynamic random access memory (DRAM), in which program control variables are stored during the execution by the CPU 201 of a control operation. Various configuration parameters and various working buffers are also stored in the RAM 203. A storage unit 204 is a hard disk (HD) or the like in which document data and images are stored. A control panel 206 includes a keyboard, a touch panel, or the like and allows the user to perform various input operations. A display unit 207 is, for example, a liquid crystal display, which displays messages and menu commands to the user. A LAN I/F 208 is an interface for connection to a LAN 209. A USB I/F 210 is an interface for connection to a USB line 211.

With the configuration described above, the user uses the control panel 206 to specify a part of a vector image displayed on the display unit 207. Then, a vector image obtained on the basis of the location of the specified area can be transferred via the LAN 102 to the network printer 104 or to the file server 105.

An XML-based SVG will be described as an exemplary structured document. The following description refers to an example in which an image scanned by the scanner 101 is saved in SVG format (i.e., saved as vector data) and a portion included in a specified area is extracted from the saved vector image.

Figures 7A, 7B:
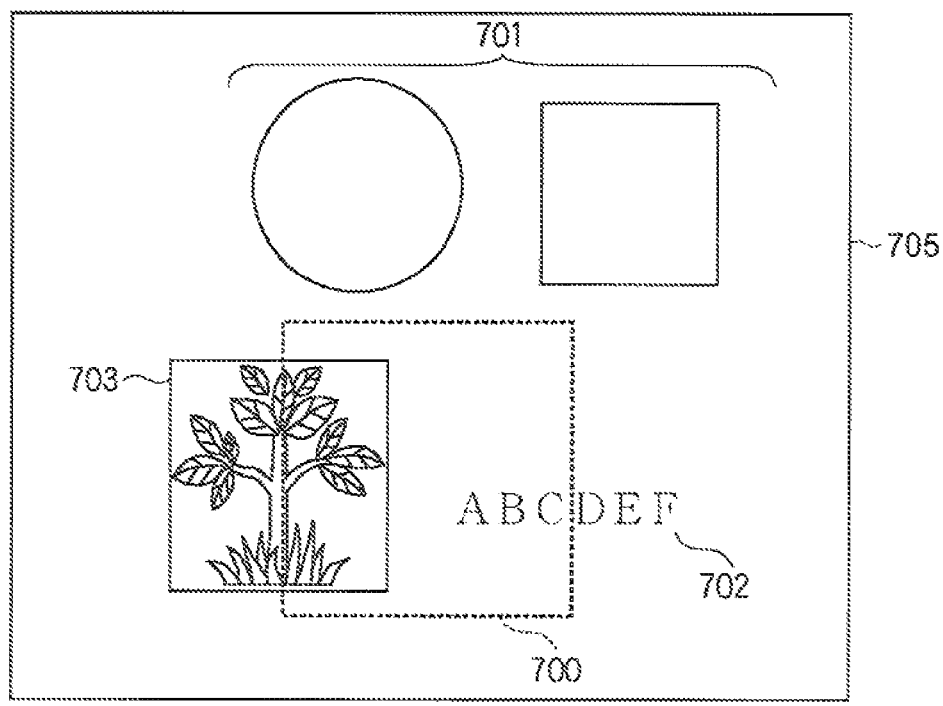
FIG. 7A shows an exemplary vector image according to a first exemplary embodiment.
FIG. 7B shows exemplary structured document data corresponding to the vector image in FIG. 7A.

FIG. 7A shows an exemplary vector image according to the present exemplary embodiment, and FIG. 7B shows an exemplary structured document in SVG format.

The vector image shown in FIG. 7A contains a plurality of objects, including graphics, text, and image objects. The following describes an example in which structured document data that describes a vector image in a specified area defined by a dotted rectangular area 700 in FIG. 7A is created. The vector image in FIG. 7A contains objects, such as figures 701, characters 702, and a raster image 703. Although the raster image 703 cannot be directly converted to a vector image and described in SVG format, it is possible to use the raster image 703 as an external reference to create the corresponding description. Therefore, the following will describe the raster image 703 as an exemplary object.

Referring to FIG. 7B, structured document data 710 describes a circle in the figures 701 in FIG. 7A, structured document data 711 describes the raster image 703 in FIG. 7A, structured document data 712 describes the characters 702 in FIG. 7A, and structured document data 713 describes rectangles in the figures 701 in FIG. 7A. The structured document data describes the graphic images relative to an origin (0,0) in the upper left of a display region 705.

FIG. 8 is a flowchart showing an exemplary procedure of extracting from the vector image in SVG format shown in FIG. 7A, for example, an image in the area 700 specified by the user.

Figure 9:
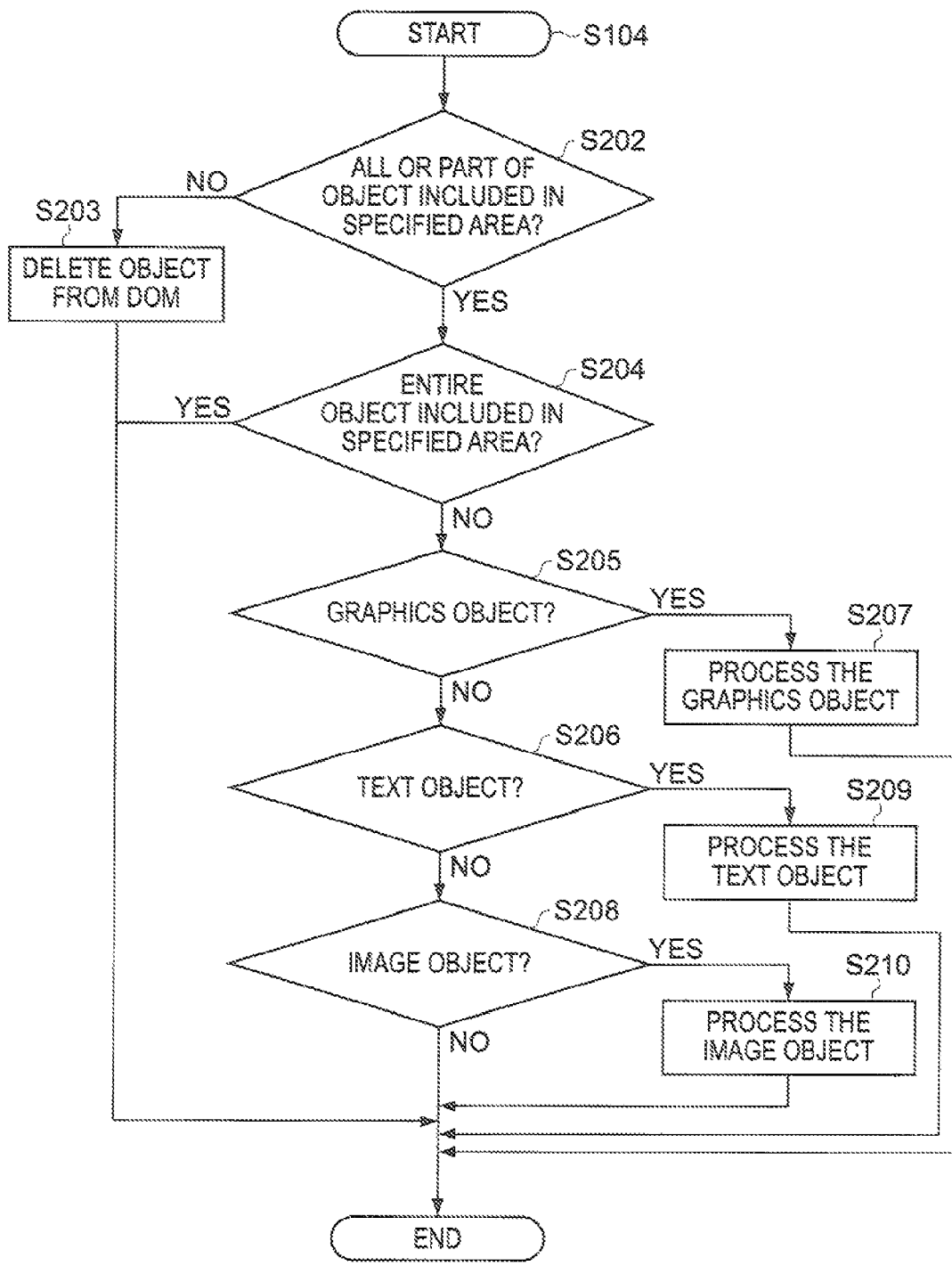
FIG. 9 is a flowchart showing a procedure of processing each object in step S104 of FIG. 8.

FIG. 9 is a flowchart showing an exemplary procedure of processing each object in step S104 of FIG. 8.

Referring to FIG. 8, in step S102, the CPU 201 shown in FIG. 6 creates tree-structured data on the basis of the structured document data in FIG. 7B and stores the created tree-structured data in the RAM 203. This tree-structured data, which is shown in FIG. 10, is object data in document object model (DOM) format as specified by the W3C.

Figure 10:
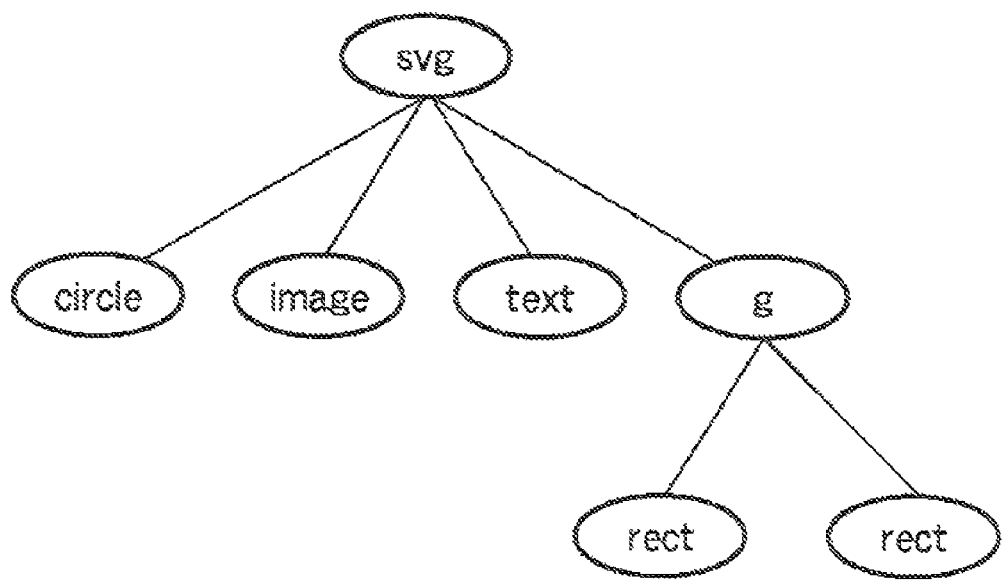
FIG. 10 shows a document object model (DOM) representing the vector image in FIG. 7A.

FIG. 10 is a structural view showing the objects in the vector image shown in FIG. 7A as data in DOM format.

When storing DOM data in the RAM 203, the CPU 201 also stores object colors and coordinates described in the structured document data. Alternatively, instead of creating data in DOM format, the CPU 201 may directly read a file that describes the structured document data. In FIG. 10, "circle" corresponds to the circle shown in the figures 701 in FIG. 7A, "image" corresponds to the raster image 703 shown in FIG. 7A, "text" corresponds to the characters 702 shown in FIG. 7A, and each "rect" under letter "g" corresponds to each of rectangles in the figures 701 shown in FIG. 7A.

Next, in step S103 of FIG. 8, the CPU 201 detects that the user has specified an area, such as the area 700 in FIG. 7A, using the control panel 206. Then, the CPU 201 obtains information about the coordinate position of the specified area (specifically, the coordinate position of the upper-left corner of the specified area, and the height and width of the specified area) in the vector image in FIG. 7A. In step S104, the CPU 201 performs processing on DOM data corresponding to each object, according to the flowchart in FIG. 9.

Figure 11:
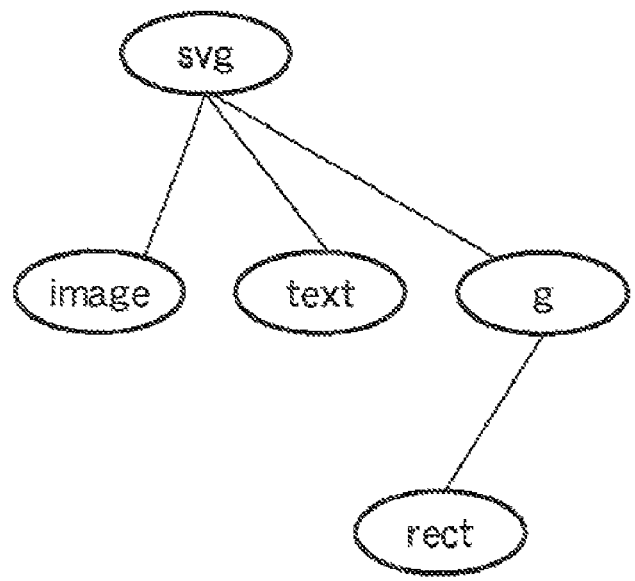
FIG. 11 shows an exemplary DOM obtained by removing, from the DOM in FIG. 10, some elements corresponding to objects that are not included in a specified area.

Referring to FIG. 9, in step S202, the CPU 201 determines whether all or part of an object is included in the specified area 700. The determination is made on the basis of the coordinate position information for the area 700 specified by the user and the coordinate position information for the object arranged in the vector image. If it is determined in step S202 that the object is not included in the specified area 700, the CPU 201 removes the object from the DOM data in FIG. 10 (step S203). FIG. 11 shows the DOM data after the removal of some objects. Processing then terminates.

In the example shown in FIG. 7A, the circle in the figures 701 and the rectangle in the upper-right corner of the vector image are not included in the area 700. Therefore, "circle" shown in FIG. 10 and corresponding to the circle in the figures 701 and "rect" shown in FIG. 10 and corresponding to the rectangle in the upper-right corner are removed and do not appear in FIG. 11.

Referring back to FIG. 9, if it is determined in step S202 that the object is included in the specified area 700, processing proceeds to step S204. If it is determined in step S204 that the entire object is included in the specified area 700, the CPU 201 immediately terminates the process. On the other hand, if only a part of the object is included in the specified area 700, the process proceeds to step S205. In step S205, the CPU 201 determines whether the object is a graphics object. If the object is a graphics object, the process proceeds to step S207, where the CPU 201 processes the object into a form that can be included in the specified area. In the example shown in FIG. 7A, a part of a rectangle in the figures 701 is included in the area 700.

FIGS. 12A, 12B, 13A, and 13B show exemplary processing performed on a graphics object according to the present exemplary embodiment.

Figures 12A, 12B:
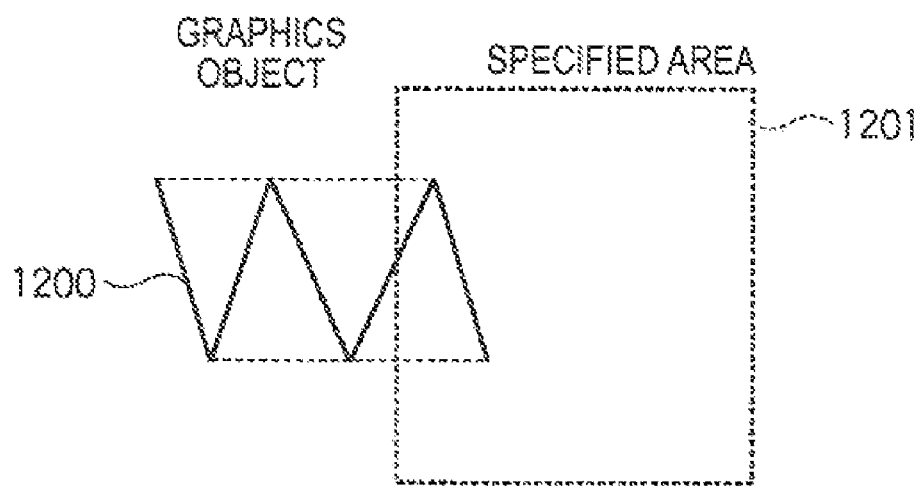

FIG. 12A shows the relationship between a graphics object 1200 and a specified area 1201, while FIG. 12B shows structured document data that describes the graphics object 1200.

The graphics object 1200 is an object composed of line segments connecting coordinate points (100,100), (200,300), (300,100), (400,300), (500,100), and (600,300).

Figure 13A:
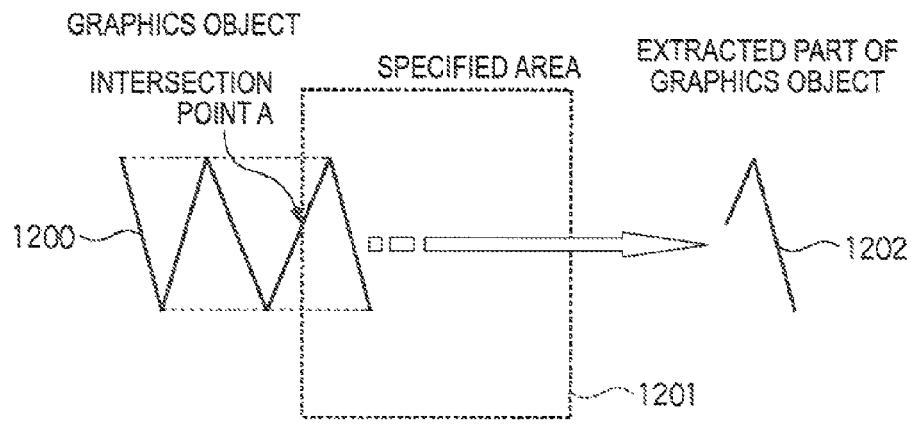

FIGS. 13A and 13B show an example in which a part of the graphics object 1200 is extracted.

FIG. 13B shows structured document data that describes a FIG. 1202 included in the specified area 1201. The specified area 1201 is defined with an origin (0, 0) as the point defining the upper left corner of the specified area. The FIG. 1202 is represented by line segments that connect points (0,200), (50,100), and (150,300) using coordinate position information relative to the point of the upper left corner of the specified area 1201. For example, the coordinates of point A in FIG. 13A can be determined by using coordinate position information for the graphics object 1200 and specified area 1201, on the basis of their relative relationship. The X-coordinate of point A is 0 and the Y-coordinate of point A is 200, which are determined relative to the point of the upper-left corner of the specified area 1201.

Figure 14:
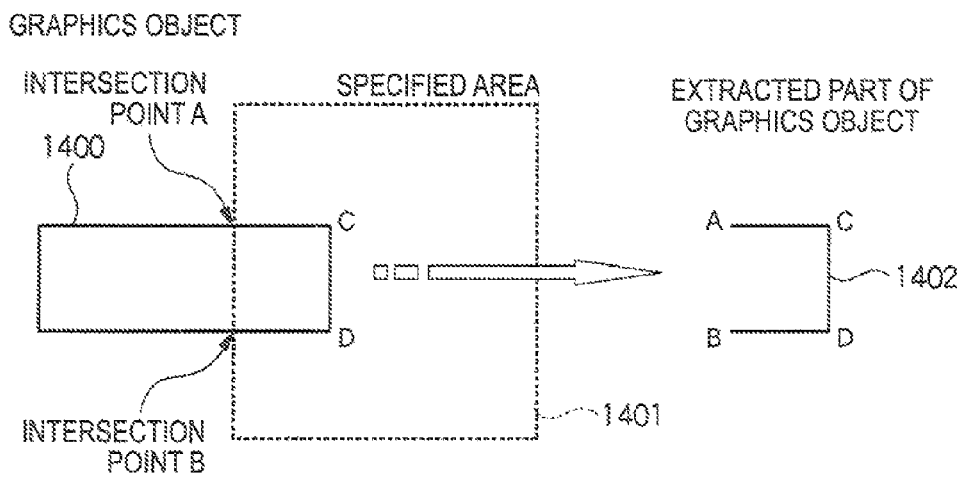
FIG. 14 shows exemplary processing performed on a rectangular graphics object.

FIG. 14 shows exemplary processing performed on a rectangular graphics object.

As shown in FIG. 14, a FIG. 1402 included in a specified area 1401 is extracted from a rectangular graphics object 1400. In FIG. 14, the coordinates of points A and B can be determined by using coordinate position information for the graphics object 1400 arranged in the vector image and coordinate position information for the specified area 1401. The extracted FIG. 1402 can be defined by a straight line connecting points A and C, a straight line connecting points C and D, and a straight line connecting points D and B.

The SVG description of the graphics object 1400 in FIG. 14 is as follows:

```
<svg>
    <rect x="10" y="100" width="100" height="30"
stroke="black"
    stroke-width="10" fill="none"/>
</svg>
```

The SVG description of the extracted FIG. 1402 relative to the specified area 1401 is as follows:

```
<svg>
    <polyine fill="none" stroke="black" stroke-width="10"
    points="0,60 30,60 30,90 0,90"/>
<svg/>
``` where, in the vector image in the example shown in FIG. 14, the coordinate position of the upper-left corner of the specified area 1401 is (80,40), the width thereof is 130, and the height thereof is 130.

Figure 15:
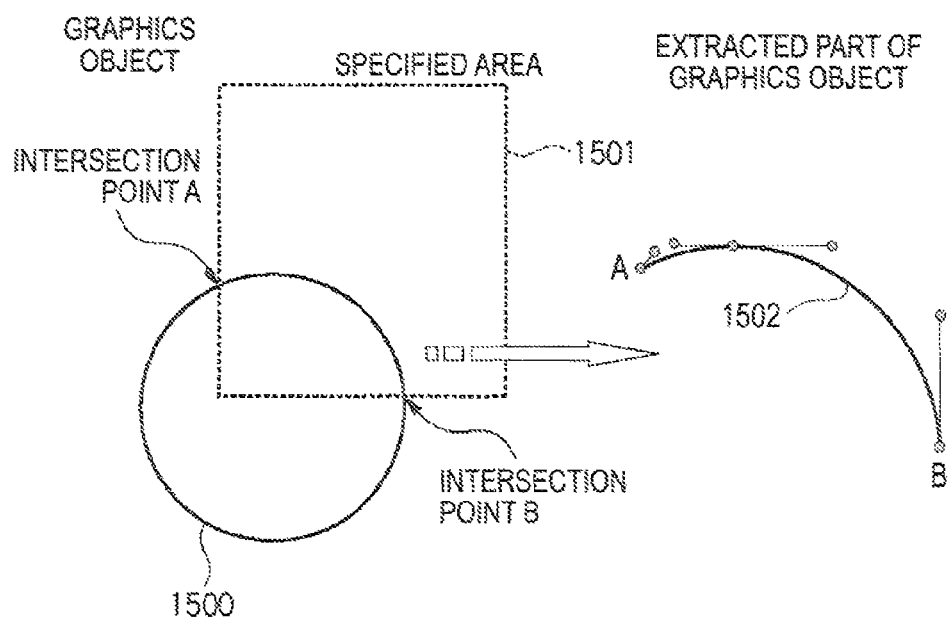
FIG. 15 shows exemplary processing performed on a circular graphics object.

FIG. 15 shows exemplary processing performed on a circular graphics object.

As shown in FIG. 15, an object is obtained by extracting from a circular graphics object 1500 a portion included in a specified area 1501. In FIG. 15, the coordinates of points A and B can be determined by using coordinates that define the graphics object 1500 and the coordinates of the specified area 1501. Then, a cubic Bezier curve 1502 having anchor points at points A and B, and direction points at external points opposite the center of the graphics object 1500 is obtained. The shape of the object included in the specified area 1501 and extracted from the graphics object 1500 can thus be determined.

The SVG description of the graphics object 1500 relative to a display area in FIG. 15 is as follows:

```
<svg>
    <circle fill="none" stroke="black" stroke-width="10"
cx="144.5" cy="147" r="144"/>
<svg/>
```

The SVG description of the extracted figure (Bezier curve) 1502 relative to a selected area (1501) that is selected from the display area is as follows:

```
<svg>
    <path fill="none" stroke="black" stroke-width="10"
    d="M185,247c0-79.5-64.5-144-144-144c-15.7,0-30.8,2.5-
45,7.2"/>
<svg/>
``` where, in the vector image in the example shown in FIG. 15, the coordinate position of the upper-left corner of the specified area 1501 is (80,100), the width thereof is 200, and the height thereof is 147.

Referring back to FIG. 9, in step S205, if the CPU 201 determines that the object is not a graphics object, the process proceeds to step S206, where the CPU 201 further determines whether the object is a text object. If the CPU 201 determines that the object is a text object, the process proceeds to step S209, where the CPU 201 processes the object into a form that can be included in the specified area.

Figure 16:
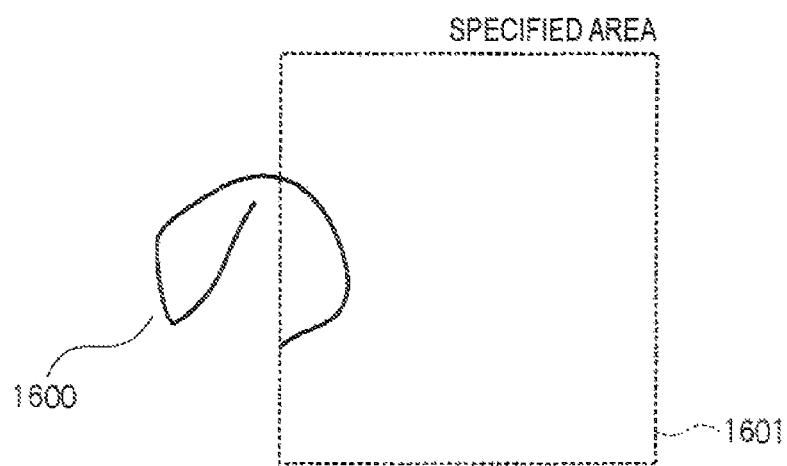
FIG. 16 shows exemplary processing performed on a text object.

FIG. 16 shows exemplary processing performed on a text object.

Referring to FIG. 16, from a text object 1600 in SVG font, a portion included in a specified area 1601 is extracted.

The SVG description of the text object 1600 in FIG. 16 is as follows:

```
<svg>
    <path fill="none" stroke="black" stroke-width="10"
    d="M93,137C189,95,155,3.5,78,8C18,12-17.5,83,30,119.5
        c11,8,33-6,43-47.5c10-42,6-60,6-60"/>
</svg>
```

Figure 17:
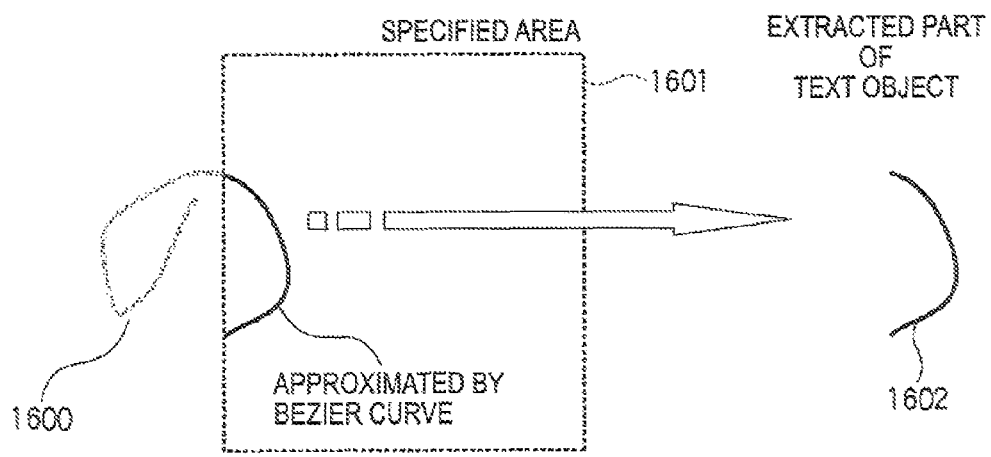
FIG. 17 shows exemplary extraction of a text object.

FIG. 17 shows the extraction of the above-described portion (in the specified area 1601) from the text object 1600.

Referring to FIG. 17, the text object 1600 is composed of a plurality of Bezier curves. Therefore, as in the case of the graphics object 1500 in FIG. 15, each point of intersection of a line defining the text object 1600 with the specified area 1601 is determined. Then, by approximating a line connecting the two intersection points with Bezier curves, a partial text object 1602 composed of approximate Bezier curves is created. In general, a text object includes a character code. If the user wishes to maintain the character code after the extraction of an object, it is possible to select the option of not performing processing on the text object.

The SVG description of the extracted partial text object 1602 is as follows:

```
<svg>
    <path fill="none" stroke="black" stroke-width="10"
    d="M0,58c69,4.5,95,89,4,129.5C94.2,147,69,63,-1,58"/>
</svg>
``` where the coordinate position of the upper-left corner of the specified area 1601 is (89,50), the width thereof is 300, and the height thereof is 300.

If the text object is a character string, the CPU 201 determines, with respect to each character in the character string, whether the character is included in a specified area by using coordinates that define each character. Then, the CPU 201 extracts a character or a character string included in the specified area. For example, in a character string "ABCDEF" in FIG. 7A, if a character string "DEF" is not included in the specified area 700, the structured document data 712 "<text>ABCDEF</text>" is changed to "<text>ABC</text>".

Referring back to FIG. 9, in step S206, if the CPU 201 determines that the object is not a text object, the process proceeds to step S208, where the CPU 201 further determines whether the object is a raster image object. If the CPU 201 determines that the object is not a raster image object, the process is terminated. If the CPU 201 determines that the object is a raster image object, the process proceeds to step S210, where the CPU 201 processes the object into a form that can be included in the specified area. In the processing of the image data (for example, as will be described with reference to FIG. 19), the CPU 201 extracts image data corresponding to the right half of the raster image 703 from an image file "image.png" corresponding to the raster image 703 in FIG. 7A. The right half of the raster image 703 is included in the specified area 700 and having a width of "50". Then, the CPU 201 creates and saves a new image file in a directory different from the one where the original image file "image.png" is located. To save the new image file in the same directory as that of the original image file "image.png", the new image file must be saved with a name, such as "image1.png", which is different from that of the original image file.

Thus, by extracting only an image included in a specified area, the present exemplary embodiment can reduce the amount of storage capacity required to store objects in the specified area. Moreover, it is possible to reduce the size of large data, such as bitmap image data, by resolution conversion.

In the processing of graphics, text, and image objects described above, the data size of each object before being processed may be stored in the RAM 203. Then, a setting screen can be provided so that the user can select the option of not processing the object if, by referring to the data size of each object stored in the RAM 203, it is found that the data size of the structured document of the object will increase after the processing.

It may also be configured such that the user can select the option of not processing the object if it is found that it takes a long time to process the object.

Figure 18:
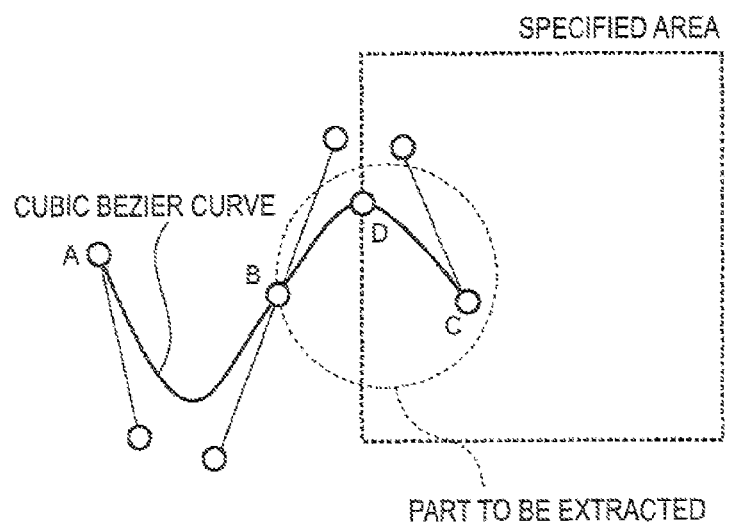
FIG. 18 shows exemplary processing performed on another type of object.

FIG. 18 shows exemplary processing performed on another type of object.

The processing of a cubic Bezier curve object will be described as an exemplary object whose data size increases after being processed. In a similar manner to that described above, the CPU 201 creates a Bezier curve object connecting points C and D in FIG. 18 by extracting, from the cubic Bezier curve object, a part included in a specified area. In this case, it is possible that the data size increases and thus it takes a long time to process the object. Therefore, the CPU 201 creates a Bezier curve object defined by points B, D, and C. This allows for the extraction of a part of the object without significantly increasing the data size.

After completion of the processing in step S104 of FIG. 8, the process proceeds to step S105, where the CPU 201 determines whether the DOM meets predetermined specifications. If the CPU 201 determines that the DOM does not meet the predetermined specifications, the process proceeds to step S107, where a description is added to or removed from the structured document data such that the predetermined specifications are met. Upon completion of the processing in step S107, or if the CPU 201 determines in step S105 that the DOM meets the predetermined specifications, the process proceeds to step S106, where the CPU 201 writes the structured document data into a file.

Figure 19:
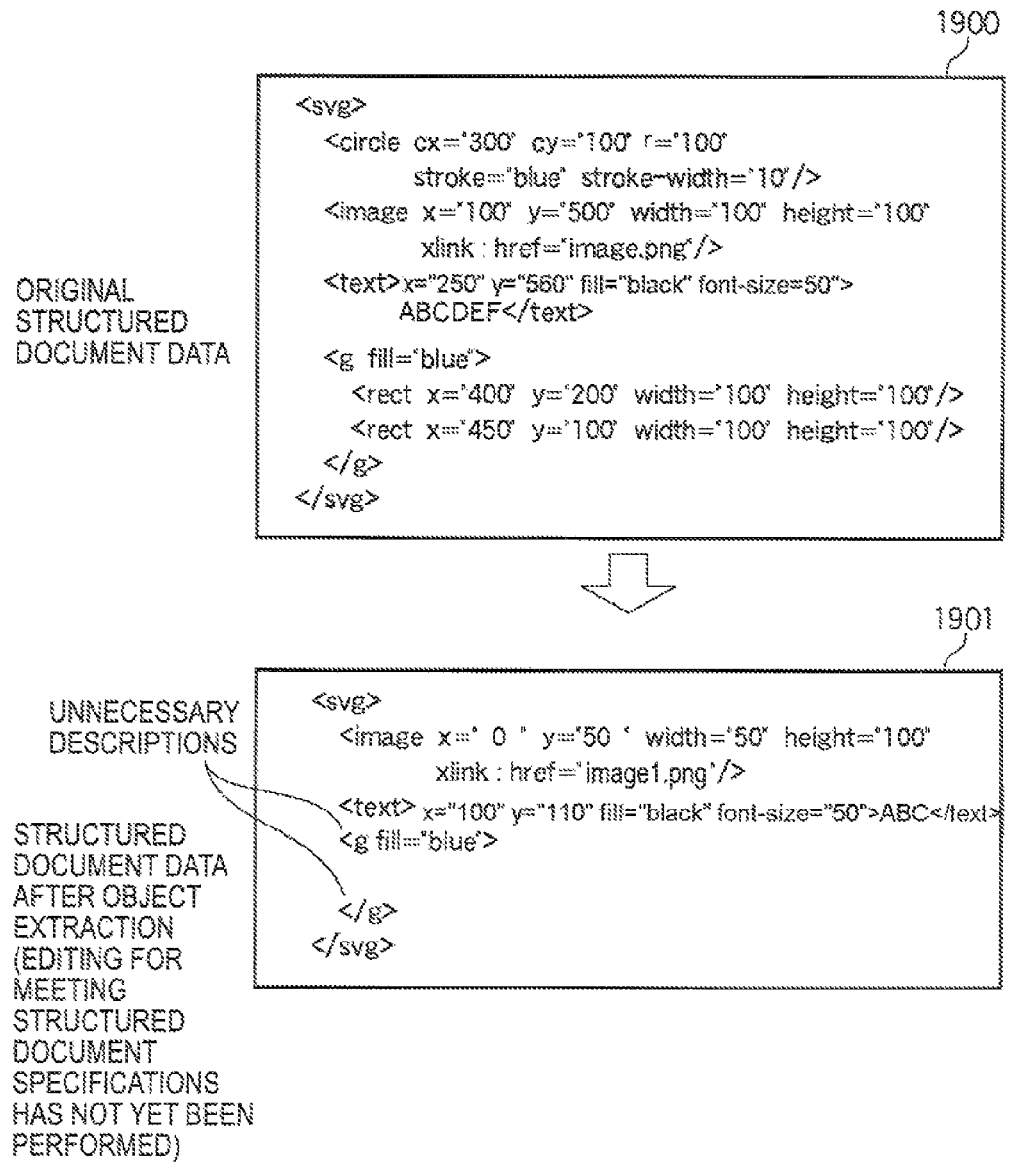
FIG. 19 shows exemplary structured document data corresponding to an original vector image, and exemplary structured document data corresponding to a partial vector image extracted from the original vector image.

FIG. 19 shows exemplary structured document data corresponding to the original vector image and to a partial vector image extracted from the original vector image.

Referring to FIG. 19, structured document data 1900 corresponds to the objects in the original vector image shown in FIG. 7A. Structured document data 1901 corresponds to the character string "ABC" in the characters 702 and to the right half of the raster image 703, which are included in the specified area 700 and extracted from the original vector image. The coordinates of the upper-left corner of the right half of the raster image 703 is (150,500), the width thereof is 50, and the height thereof is 100. In the structured document data 1901 corresponding to the extracted objects, a group element <g fill="blue"> capable of grouping a plurality of objects has no subelement. If the group element has no subelement, it is no longer needed to describe the group element in the structured document data 1901 and thus, the group element can be deleted from the structured document data.

Then, in step S108 of FIG. 8, the CPU 201 transfers the structured document data 1901 to an external device (such as a printer) and terminates the process. The CPU 201 transfers the extracted vector image to external devices, such as the network printer 104 and the file server 105 connected to the LAN 102. If the entire image on a page cannot be transferred due to the low processing capability of a printer or a scanner, the CPU 201 defines the size of image data that can be transferred. Then, the CPU 201 sequentially extracts and transfers each image element, thus transferring the entire image on the page.

In the present exemplary embodiment, the above-described processing is performed by the PC 103. The present exemplary embodiment is also applicable to the case where the scanner 101 performs the processing. In this case, an image read by the scanner 101 is converted to a vector image. Then, the above-described processing is performed in a similar manner.

An area specified by the user with a control panel does not have to be rectangular. The shape of the area may be circular or may be drawn freehand. The user may specify an area using a touch panel.

When an image is to be transferred to an external device, such as a printer, a copier, or a facsimile, the user or a controller of the device may specify an area in accordance with the processing capability of the device.

The following effects can be achieved by the processing described above. For example, in a map drawn in the form of a vector image, such as an SVG, map information corresponding to an area that is not necessary for the user is deleted by specifying and extracting only an area that the user requires. Therefore, even if the user transfers structured document data corresponding to the extracted map to an external device with limited resources, such as a mobile phone, it is possible to draw the map in a short period of time.

Second Exemplary Embodiment

Figure 23:
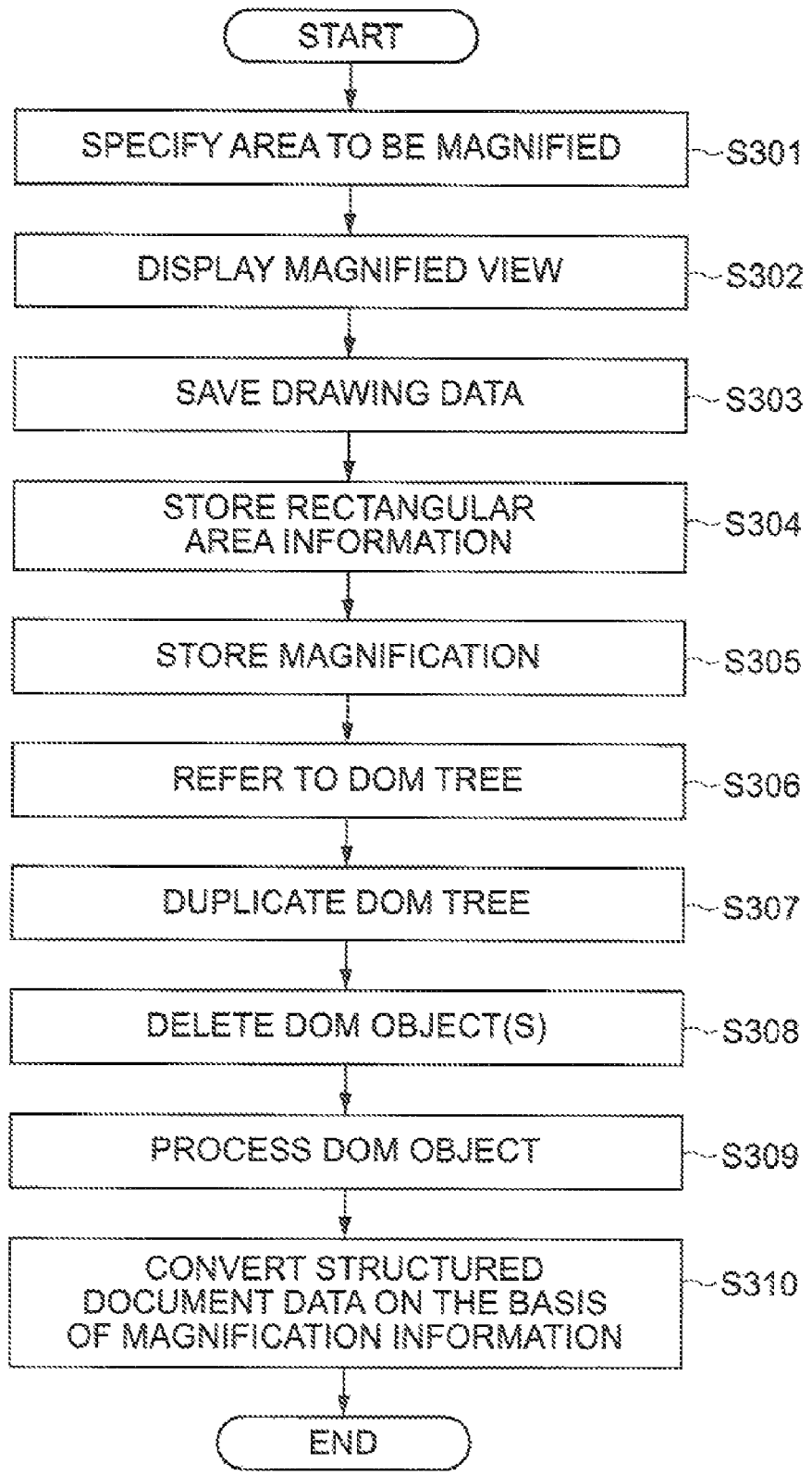
FIG. 23 is a flowchart showing a procedure of conversion of structured document data for magnifying the display of drawing data in a rectangular area according to a second exemplary embodiment.

FIG. 23 is a flowchart showing a procedure of displaying a magnified view of text, graphics, and image objects that are small and difficult to see, and duplicating the corresponding data while maintaining the magnified state.

Figure 20A:
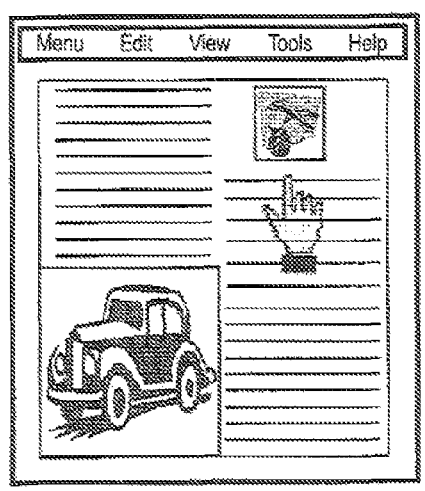
FIGS. 20A and 20B show processing for magnifying the display of drawing data.
Figure 20B:
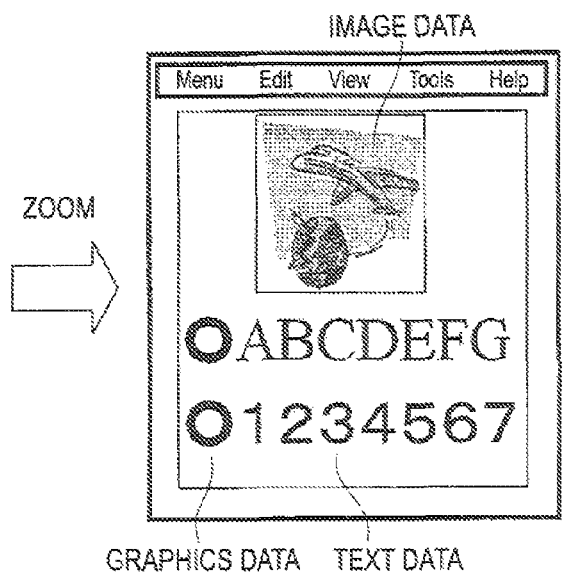
Figure 21:
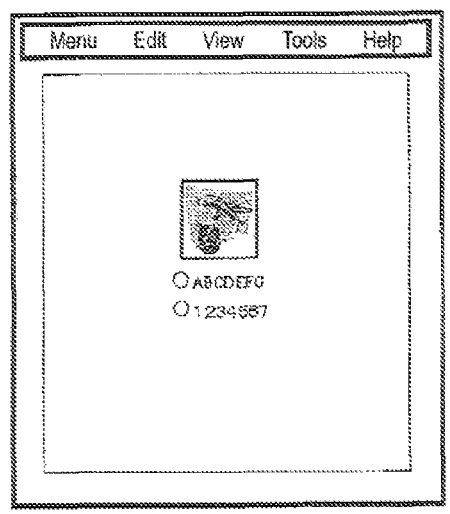
FIG. 21 shows exemplary display of drawing data.

For example, when a desired rectangular area is specified in a drawing area within a window such as is shown in FIG. 20A, objects in the specified rectangular area are magnified as shown in FIG. 20B. Then, if the processing according to the first exemplary embodiment is performed in this case, structured document data that allows a window shown in FIG. 21 to appear is obtained. The second exemplary embodiment is a modified first exemplary embodiment for allowing conversion to structured document data that can maintain the magnified state of objects within a specified rectangular area.

Figure 22B:
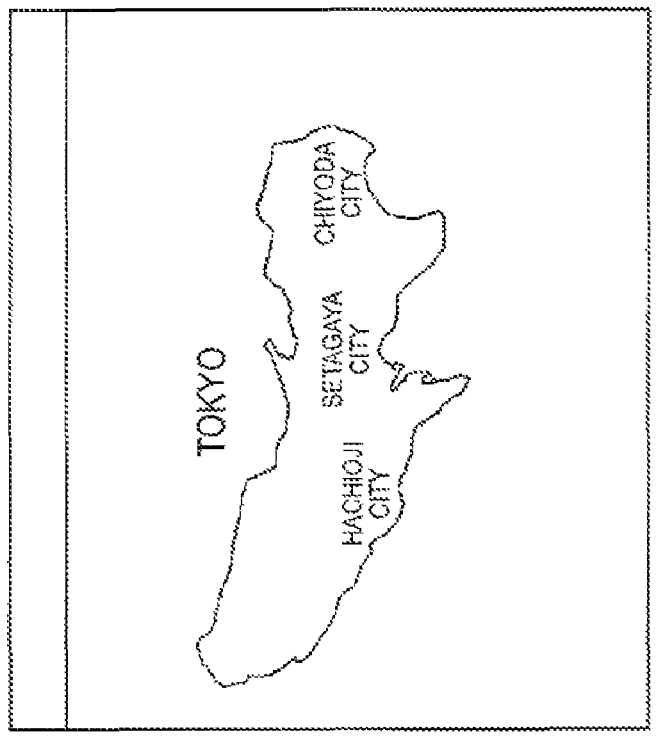
FIGS. 22A and 22B show processing for magnifying the display of drawing data.
Figure 22A:
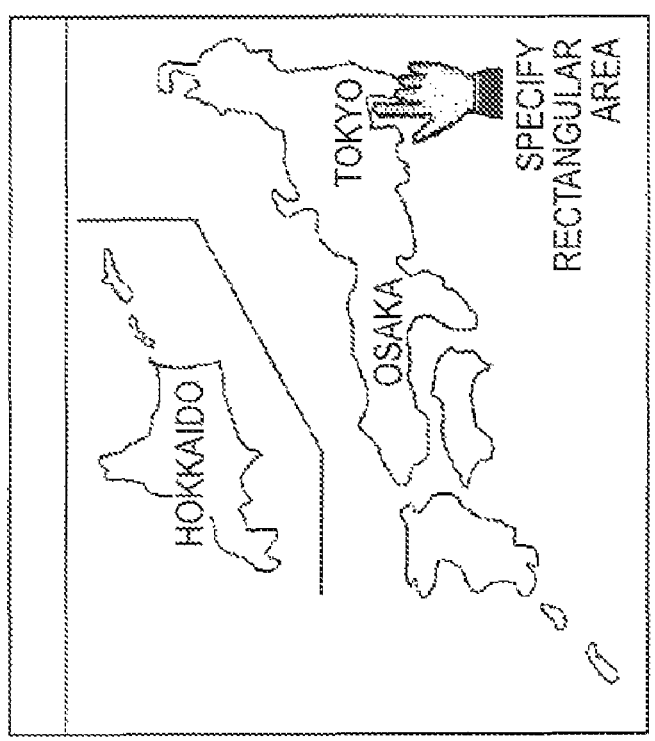

First, as in FIG. 22A, the user uses a mouse to specify an area to be magnified. The CPU 201 detects the specified area (step S301 of FIG. 23).

Upon detection, the CPU 201 displays a magnified view of the area specified in the window as shown in FIG. 22B (step S302). FIG. 22B shows a map obtained by magnifying a part of the map in FIG. 22A. Map information corresponding to the magnified map in FIG. 22B includes text data, graphics data, and image data.

Next, the CPU 201 detects that the user has selected, by using the mouse, the option of saving drawing data in the magnified rectangular area (step S303). In response to the detection of this operation, the CPU 201 stores, in the RAM 203, the coordinates of the upper-left corner (340, 594), the width 230 px, and the height 230 px of the magnified rectangular area in the window relative to the area shown in FIG. 22A (step S304). The CPU 201 also stores, in the RAM 203, information related to the display magnification (two times) specified by the user (step S305). While the display magnification of the map in FIG. 22B is not actually twice that of the map in FIG. 22A, the present exemplary embodiment will be described on the assumption that it actually is.

The following describes an exemplary method for storing, in the RAM 203, data selected by the user with a pointing device, such as a mouse.

FIG. 25 shows structured document data describing the objects shown in FIG. 22A. The structured document data in FIG. 25 is described in SVG.

The structured document data in FIG. 25 contains map information for each prefecture in Japan. Specifically, the structured document data contains text objects representing the names of prefectures, cities, towns, and villages, and path object data (outline data) representing the shapes of prefectures, cities, towns, and villages. Image objects corresponding to image data may be used to represent the shapes of prefectures, cities, towns, and villages. The structured document data may further contain path object data representing information about highways and railroad tracks.

A DOM tree corresponding to the structured document data in FIG. 25 is stored in the RAM 203. The CPU 201 refers to this DOM tree for drawing the map shown in FIG. 22A (step S306 of FIG. 23). FIG. 26 shows a DOM tree generated from the structured document data in FIG. 25.

The CPU 201 creates in the RAM 203 a copy of the DOM tree for the map of Japan shown in FIG. 26 (step S307). From the duplicated DOM tree, the CPU 201 extracts the nodes of map data for Tokyo specified by the user while deleting the nodes of map data for all the other prefectures (step S308).

Moreover, the CPU 201 extracts from the duplicated DOM tree the nodes of text, graphics, and image objects partially included in the magnified rectangular area, and processes the objects corresponding to the extracted nodes (step S309).

Figure 24:
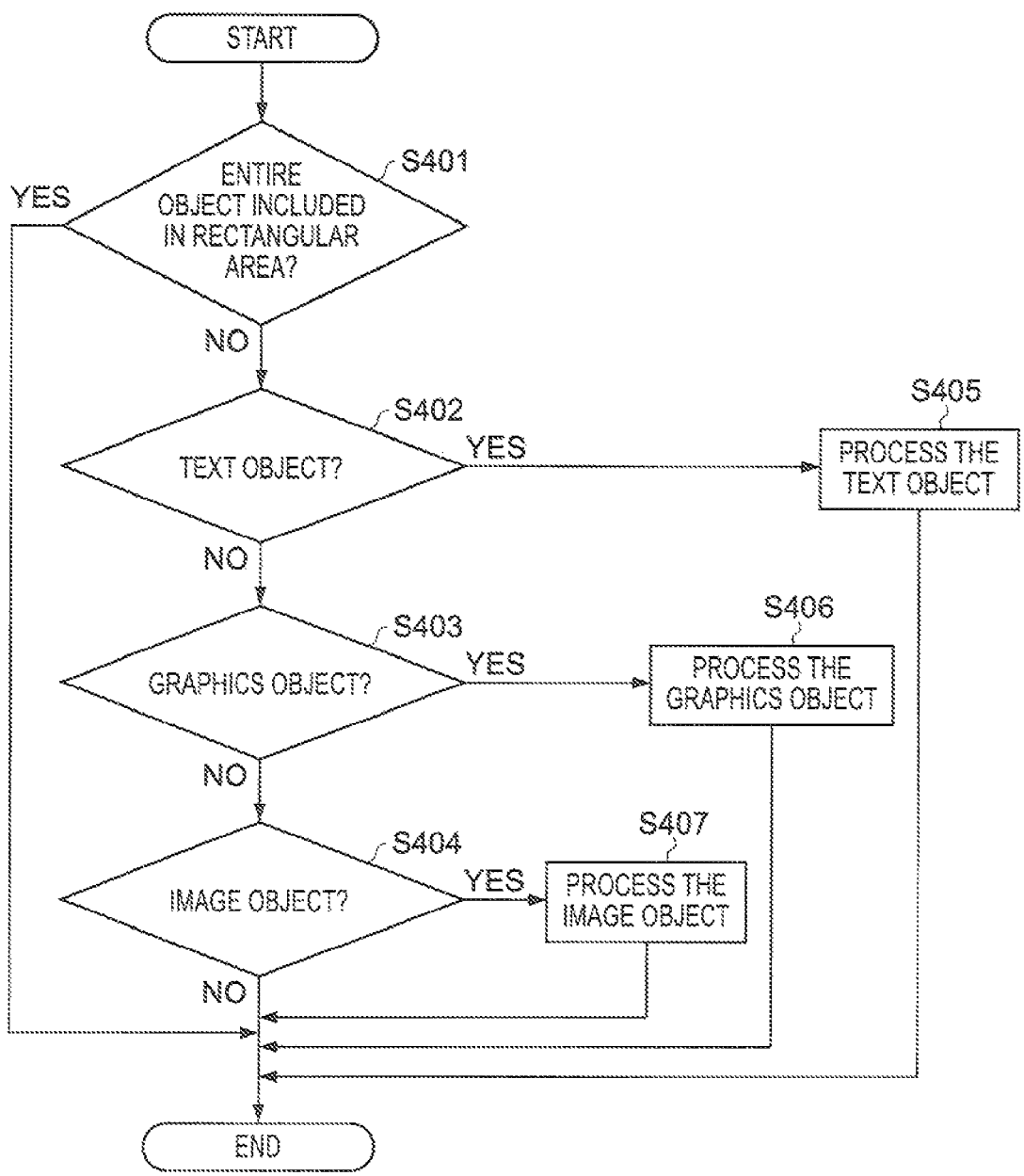
FIG. 24 is a flowchart showing a procedure of extraction of an object, which is the drawing data, in the rectangular area according to the second exemplary embodiment.

FIG. 24 is a flowchart showing an exemplary detail procedure of the processing performed in step S309 of FIG. 23. The CPU 201 performs the following processing on an object corresponding to each subelement of a <g> element in the structured document data in FIG. 25.

First, the CPU 201 determines with respect to an object whether the entire object is included in the rectangular area specified by the user (step S401 of FIG. 24).

If it is determined in step S401 that the entire object is included in the rectangular area, the CPU 201 terminates the process without deleting the object. On the other hand, if it is determined in step S401 that the entire object is not included in the rectangular area, the CPU 201 determines whether the object is a text object (step S402).

If it is determined in step S402 that the object is a text object, the CPU 201 processes the text object, e.g., deletes, from the text object, a character string that is not included in the rectangular area (step S405). If it is determined in step S402 that the object is not a text object, the CPU 201 determines whether the object is a graphics object (step S403).

If it is determined in step S403 that the object is a graphics object, the CPU 201 processes the graphics object, e.g., extracts from the graphics object a portion included in the rectangular area and stores the extracted portion in the RAM 203, thus updating the graphics object (step S406).

If it is determined in step S403 that the object is not a graphics object, the CPU 201 determines whether the object is an image object (step S404). If it is determined in step S404 that the object is an image object, the CPU 201 processes the image object, e.g., extracts from the image object a portion included in the rectangular area and stores the extracted portion in the RAM 203, thus updating the image object (step S407).

The CPU 201 performs a series of processing in steps S401 to S407 with respect to each object.

Figures 27, 28:
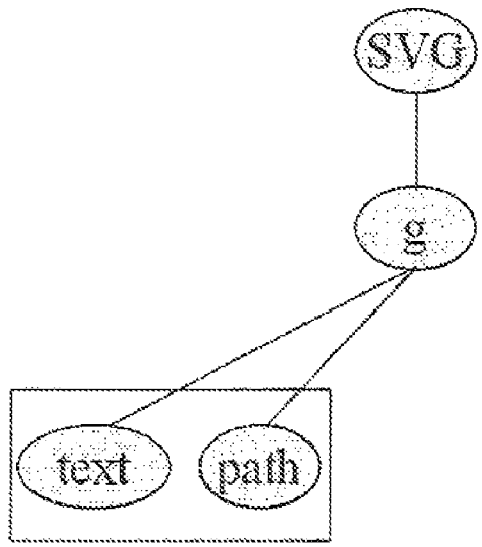
FIG. 27 shows exemplary structured document data obtained by conversion.
FIG. 28 shows an exemplary DOM tree corresponding to the drawing data in FIG. 22B.

FIG. 27 shows structured document data obtained by processing the objects included in the rectangular area specified by the user. FIG. 28 shows the DOM tree representation of the structured document data in FIG. 27 in which map data for only Tokyo is included.

Through a series of processing steps performed on each object included in the structured document data (DOM tree), objects other than those related to Tokyo selected by the user are deleted. Then, the text, graphics, and image objects are updated such that portions thereof that not included in the rectangular area are removed. As a modification of step S309 in FIG. 23, in a device with limited resources (such as a mobile device), it is possible not to process the object and not to delete the object from the duplicated DOM if the object is partially included in the rectangular area.

In step S401 of FIG. 24, a determination as to whether each text object is included in the rectangular area is made as follows. That is, the determination is made by determining whether each drawing position of the text object determined with respect to each pixel, on the basis of the coordinate position and font size (and type) of the text object shown in FIG. 25, is included in the rectangular area. Likewise, for each graphics object and image object, the above-described determination is made by determining whether each drawing position determined with respect to each pixel, on the basis of the object data in the structured document data, is included in the rectangular area.

Referring back to FIG. 23, after the processing in step S309, the CPU 201 performs processing to obtain structured document data that allows the magnified map in FIG. 22B to be drawn. Specifically, the CPU 201 converts the map data for Tokyo shown in FIG. 27 into structured document data containing information related to the display magnification of the map shown in FIG. 22B (step S310).

A first possible method is to perform affine transformation to update the structured document data in FIG. 27.

First, on the basis of the coordinates of the upper-left corner (340,594), the width 230 px, and the height 230 px, which are stored in the RAM 203, of the rectangular area to be magnified, the rectangular area is translated such that the center position thereof matches the origin coordinates (0,0). The rectangular area is magnified on the basis of a magnification of two times stored in internal memory, and translated such that the coordinates of the upper-left corner thereof matches the origin coordinates (0,0).

Attribute values indicating a series of the above-described procedure are as follows:
    transform="translate(230,230), scale(2,2), translate (−455,−709)"
This "transform" attribute is added to the structured document data in FIG. 27 as the attribute of a "g" element, which is a subelement of an "svg" element.

The attribute values of the "transform" attribute can be generalized as follows:
    translate (w/2*v,h/2*v), scale (v,v), translate (−x−w/2,−y−h/2)
where (x,y) is the coordinates of the upper-left corner of the rectangular area the user specified in the original map for enlargement, "w" is the width of the rectangular area, "h" is the height of the rectangular area, and "v" is the magnification of the rectangular area. Then, adding the above-described "transform" attribute to the "g" element converts the structured document data shown in FIG. 27 to structured document data shown in FIG. 29.

A second possible method is to perform affine transformation such that the initial center position when the original map is drawn matches the area to be magnified. Specifically, "viewBox" attribute data having a list of four numerical attribute values separated by spaces or commas is added to the "svg" element in the SVG.

First, the CPU 201 specifies the coordinates of the upper-left corner of the rectangular area to be magnified (340,594), the coordinates being relative to the original map area and stored in the RAM 203, as the two initial numerical values in the attribute values of the "viewBox attribute". Moreover, the CPU 201 specifies values obtained by multiplying each of the width 230 px and height 230 px of the rectangular area to be magnified by a magnification of 2 stored in the RAM 203, as a list of two remaining numerical values. In other words, the "viewBox" attribute, viewBox="340 594 460 460", is added to the "svg" element.

In general, the attribute values of the "viewBox" attribute can be expressed as follows:
    x y w*v h*v
where (x,y) is the coordinates of the upper-left corner of the rectangular area the user specified in the original map for enlargement, "w" is the width of the rectangular area, "h" is the height of the rectangular area, and "v" is the magnification of the rectangular area. Then, adding the above-described "viewBox" attribute to the "svg" element converts the structured document data shown in FIG. 27 to structured document data shown in FIG. 30.

A third possible method is to update the font size and position coordinates of a text object, and the attribute values of a "d" attribute relative to the x and y coordinates of a path object (outline object).

First, a method for updating a text object will be described. The font size of the text object is set to two times that of the original text object on the basis of a display magnification of two times stored in the RAM 203. The position coordinates of the text object can be obtained by determining the difference between the coordinates of the upper-left corner of the rectangular area to be magnified (340, 594) relative to the original map area, and the position coordinates of the text object relative to the original map area. That is, the text object is updated to <text x="113" y="126" font-size="20">Tokyo</text>.

Next, a method for updating a path object representing the outline (outer edge) of Tokyo will be described. First, the rectangular area to be magnified including a path object representing the shape of Tokyo is translated such that the center position of the rectangular area matches the origin coordinates (0,0). The rectangular area is magnified on the basis of a magnification of two times stored in the RAM 203, and then translated such that the coordinates of the upper-left corner of the magnified rectangular area matches the origin coordinates (0,0).

In other words, the attribute values of the "d" attribute representing the outline of Tokyo are calculated in a similar manner to the above-described case where the affine transformation is performed using the "transform" attribute to update the structured document data. The attribute values of a "stroke-width" attribute related to the line weight of the path object can be determined on the basis of a magnification of two times. Therefore, the path object is updated to <path fill="none" stroke="black" stroke-width="4.0"
d="M 118.1902 206.2466 C 71.6528 206.2466 . . . (snip) . . . "/>. Thus, the structured document data shown in FIG. 27 is converted to structured document data shown in FIG. 31.

In the above-described operation, when drawing data, such as magnified small and hard-to-see maps and drawings, is to be saved, the corresponding structured document data is converted such that the magnified state can be maintained. Therefore, the drawing data can be saved while maintaining the magnified state.

Program code (software) that performs the functions of the above-described exemplary embodiments can be supplied directly or from a remote device to a system or apparatus, and a computer of the system or apparatus reads and executes the supplied program code to perform the functions of the above-described exemplary embodiments. The program does not necessarily have to be in the form of a program, as long as it has the functions of the program. The program code that is installed in the computer for performing the functional processing of the present invention also achieves the present invention. The program may take any form, including object code, a program executed by an interpreter, or script data supplied to an operating system (OS), as long as it has the functions of the program.

Examples of a storage medium for supplying the program include a floppy disk, a hard disk, an optical disk, a magneto-optical (MO) disk, a compact-disk read-only memory (CD-ROM), a CD-recordable (CD-R), a CD-rewritable (CD-RW), a magnetic tape, a nonvolatile memory card, a ROM, and a digital versatile disk (DVD) (e.g. a DVD-ROM and a DVD-R). In another possible method of supplying the program, the computer program of the present invention or a file produced by compressing the computer program of the present invention and provided with an automatic installation function is downloaded into a storage medium, such as a hard disk, from an Internet site accessed through a browser on a client computer. In another possible supplying method, program code included in the program of the present invention is divided into a plurality of files, which are then downloaded from different Internet sites. Therefore, a World Wide Web (WWW) server that allows a plurality of users to download program files for performing the functional processing of the present invention in computers is also included in the scope of the present invention.

In another possible method, the program is encrypted, stored in a storage medium, such as a CD-ROM, and distributed to users. Then, users who meet predetermined conditions download key information that decrypts the encrypted program from an Internet site, use the key information to execute and allow the encrypted program to be installed in computers, thus allowing the functions of the program of the present invention to be performed.

In addition to the cases where the functions of the above-described exemplary embodiments are performed when a computer reads and executes the program, there are other cases where the functions of the above-described exemplary embodiments are performed. For example, on the basis of instructions of the program, an OS running on the computer carries out all or part of the actual processing. This also allows the functions of the above-described exemplary embodiments to be performed.

The functions of the above-described exemplary embodiments are also performed when the program read out of a storage medium is written in a function expansion board in a computer or in a memory of a function expansion unit connected to a computer and then, on the basis of instructions of the program, the function expansion board or a CPU in the function expansion unit carries out all or part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-171657 filed Jun. 10, 2005 and No. 2006-100389 filed Mar. 31, 2006, which are hereby incorporated by reference herein in their entirety.

What is claimed is:

1. An image processing apparatus comprising:
a displaying unit configured to display a vector image in a display region based on a structured document which comprises a first drawing description for a plurality of objects, the first drawing description defining a first shape type and a first coordinate position of the plurality of objects;
a setting unit configured to set an area in the display region displayed by the displaying unit;
a first determining unit configured to determine whether entire or part of the vector image is included in the set area based on the set area, and the first shape type and the first coordinate position of the first drawing description;
a second determining unit configured to determine an intersection coordinate position at which a circumference of the set area and the vector image whose part is determined to be included in the set area intersect, based on the first shape type and the first coordinate position of the first drawing description;
a third determining unit configured to determine a second drawing description from the first drawing description for the vector image whose entirety is determined to be included in the set area;
a first generating unit configured to generate a third drawing description from the first drawing description for the vector image whose part is determined to be included in the set area based on the intersection coordinate position determined by the second determining unit, the third drawing description comprising a second shape type and a second coordinate position; and
an output unit configured to output a compact structured document in the format of the structured document, the compact structured document comprising the second drawing description and the third drawing description.

2. The image processing apparatus according to claim 1, wherein the first generating unit generates the third drawing description without converting the first drawing description to a raster image.

3. The image processing apparatus according to claim 1, wherein the setting unit interactively sets the area in the display region based on user input.

4. The image processing apparatus according to claim 1, wherein the setting unit sets the area in the display region displayed by the displaying unit based on user input, the set area having particular user-specified coordinate positions.

5. The image processing apparatus according to claim 1, wherein the format of the structured document is XML (extensible markup language).

6. The image processing apparatus according to claim 1, wherein the format of the structured document is SVG (scalable vector graphics).

7. The image processing apparatus according to claim 1, wherein the first shape type is one of a circle shape type, an ellipse shape type, and a curve, and
wherein the third drawing description is generated by approximating a shape of the object with a Bezier curve.

8. The image processing apparatus according to claim 1, further comprising a deleting unit configured to delete a parent element if any sub-element does not exist.

9. The image processing apparatus according to claim 1, further comprising:
an addition unit configured to add scaling attribute information to the compact structured document based on the set area.

10. The image processing apparatus according to claim 1, wherein the third drawing description comprises the second shape type and the second coordinate position in a coordinate system of the set area.

11. The image processing apparatus according to claim 1, wherein the displaying unit displays the vector image and a raster image in the display region based on the structured document, the apparatus further comprising:
a fourth determining unit configured to determine whether entire or part of the raster image is included in the set area; and
a second generating unit configured to generate a new raster image data for the raster image whose part is included in the set area.

12. The image processing apparatus according to claim 11, wherein the output unit outputs the compact structured document comprising the second drawing description, the third drawing description and a link to the new raster image data.

13. The image processing apparatus according to claim 11, further comprising:
- a comparing unit configured to compare a data size of the raster image and a data size of the new raster image data; and
- a fifth determining unit configured to determine whether to generate the new raster image data by the second generating unit based on the comparison by the comparing unit.

14. The image processing apparatus according to claim 11, wherein the new raster image data is generated in the same directory as the raster image data.

15. The image processing apparatus according to claim 11, further comprising a resolution conversion unit configured to reduce a size of the new raster image data by applying a resolution conversion process.

16. An image processing method comprising:
- displaying a vector image in a display region based on a structured document which comprises a first drawing description for a plurality of objects, the first drawing description defining a first shape type and a first coordinate position of the plurality of objects;
- setting an area in the displayed display region;
- determining whether entire or part of the vector image is included in the set area based on the set area, and the first shape type and the first coordinate position of the first drawing description;
- determining an intersection coordinate position at which a circumference of the set area and the vector image whose part is determined to be included in the set area intersect, based on the first shape type and the first coordinate position of the first drawing description;
- determining a second drawing description from the first drawing description for the vector image whose entirety is determined to be included in the set area;
- generating a third drawing description, using a processor, from the first drawing description for the vector image whose part is determined to be included in the set area based on the intersection coordinate position determined by the second determining unit, the third drawing description comprising a second shape type and a second coordinate position; and
- outputting a compact structured document in the format of the structured document, the compact structured document comprising the second drawing description and the third drawing description.

17. A non-transitory computer readable storage medium for storing a program for causing an information processing apparatus to perform an information processing method for processing a structured document according to claim 16.

* * * * *